Dec. 14, 1948.    G. M. GIANNINI    2,456,261
LOW TORQUE TOROIDAL RESISTOR

Filed Aug. 13, 1946    3 Sheets-Sheet 1

INVENTOR.
GABRIEL M. GIANNINI
BY
*W. Glenn Jones*
ATTY.

Dec. 14, 1948. G. M. GIANNINI 2,456,261
LOW TORQUE TOROIDAL RESISTOR
Filed Aug. 13, 1946 3 Sheets-Sheet 2
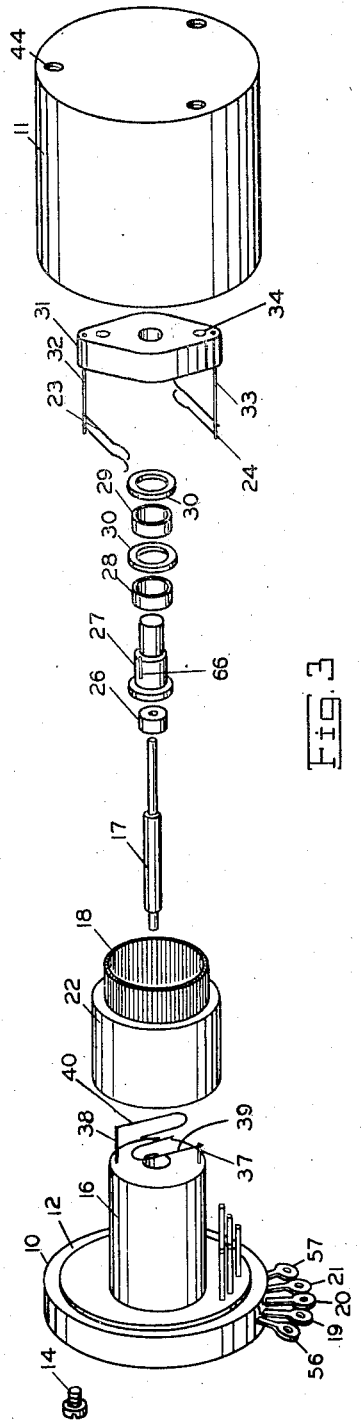
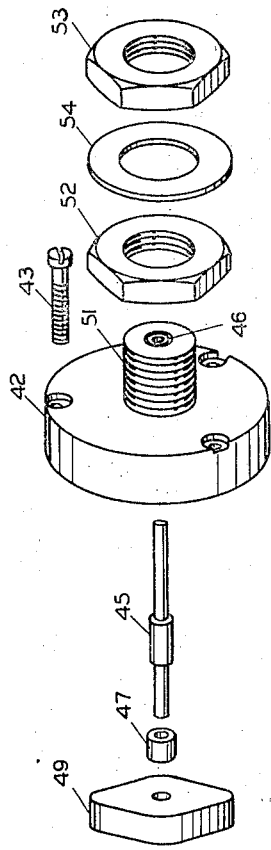
*INVENTOR.*
GABRIEL M. GIANNINI
BY
ATTY.

Dec. 14, 1948.                    G. M. GIANNINI                    2,456,261
                            LOW TORQUE TOROIDAL RESISTOR
Filed Aug. 13, 1946                                          3 Sheets-Sheet 3

INVENTOR.
GABRIEL M. GIANNINI
BY
W. Glenn Jones
                ATTY.

Patented Dec. 14, 1948

2,456,261

UNITED STATES PATENT OFFICE 2,456,261

LOW TORQUE TOROIDAL RESISTOR

Gabriel M. Giannini, Pasadena, Calif., assignor to G. M. Giannini & Co. Inc., Pasadena, Calif., a corporation of New York Application August 13, 1946, Serial No. 690,314

7 Claims. (Cl. 201—56)

This invention relates to variable resistors of the type characterized as rheostats or potentiometers and which are particularly adapted for use in remote indicating systems.

Remote indicating systems, as presently employed, fall into three general classifications. The first classification involves the type of system in which direct pressure connection is employed between the indicator instrument and the factor desired to be indicated. Such systems usually are implemented by means of a fluid pressure transmitting medium passing through and along fluid conduits. These are subject to faulty operation at extreme temperatures and may fail of proper indication because of breaks or leaks in the fluid conduits. Long lines may also be subject to vibration leading to faulty indication as well as presenting possible operational hazards, particularly in aircraft.

A second classification involves the alternating current Selsyn type remote indicating system wherein an electric motor operates the indicator at a point remote from the factor to be measured or indicated. The receiving-indicating motor is controlled by and answers to corresponding variations in a transmitting electric motor which is actuated in some mechanical manner by the device manifesting the physical factor under observation. Such systems are of great advantage in certain applications, but are apt to be complicated, expensive, and of prohibitive size and weight, particularly with regard to the transmitter and its necessary mechanical connections to the quantity being measured or indicated.

A third classification involves a system utilizing an electric circuit employing current or voltage responsive indicator means in which the varying physical force of the factor desired to be measured is caused to vary the resistance in the circuit to produce a corresponding variation in the current or voltage responsive indicating means at the remote location. The present invention relates to this latter class of remote indicating systems.

The latter two classifications of remote indicating systems mentioned above are included in the general nomenclature of electrical telemetering which may be defined here as the technique of electrically transmitting measurements obtained from a primary measuring instrument to a secondary recording or indicating instrument some distance from the measuring instrument by means of a transmitting device located at the point of measurement and a medium of electrical communication connecting the transmitting and receiving instruments. This art is becoming increasingly important in the field of measurement and control.

One of the trends of modern instrumentation is to concentrate on one central control board all the instruments and controls involved in a particular process or plant. Such concentration not only makes the instruments more valuable because they can be more easily consulted by operators and supervisors, but may serve to reduce the number of operators required to perform a given operation. In other applications, such concentration of recording instruments may enable a single operator to possess the necessary information for his control of the operation, such as in piloting an aircraft or other mobile unit where the direct measuring instruments may be located in places inaccessible to either the operator or his assistants. Again, the direct measuring instruments may be located in atmospheres inimical to human beings such as in various localities in chemical plants or devices located exteriorly of the hulls of stratosphere flying aircraft or under water submersibles.

In the present state of the art, electrical telemetering is the most widely used and versatile means of transmitting measurements because of its inherent advantages of being able to transmit minute primary-element responses without distortion or friction, electrical power is almost universally available, transmission lines are cheap, easily installed and maintained, almost unlimited distances may be traversed and time lags in the transmitting system are negligible. Each telemetering system must have the following three essential components, namely a measuring and transmitting device, a transmission path, and a receiving-indicator. Obviously these may take many forms dependent on the class and type of measurement or indication to be transmitted and received.

Of the many possible forms of electrical telemetering involving the foregoing components, the simplest and the best for reasons of trouble-free operation, simplicity, and economy is that form considered above as the third classification. In this system which constitutes the current-variation method, a simple two-wire circuit is established between the measuring device and the receiving instrument. On the transmitting end of the circuit a rheostat is operated by the measuring element of the telemeter. The variations in current produced by the movement of the rheostat are measured by an ammeter of the indicating or recording type at the receiving end of the circuit. Another form of telemetering utilizing a 360° resistance unit as the transmitting element may feed into an indicator-receiver of the Selsyn type by means of a three-wire connection. Other types of circuits using a resistance transmitter may be utilized by those skilled in the art including null and balance systems based on the Wheatstone bridge as well as A. C. or D. C. positioning devices.

In all of the prior art systems utilizing a rheostat or potentiometer as a transmitting element, one of the great disadvantages resulted from the fact that the primary measuring device must have sufficient power to operate the rheostat or potentiometer. Such resistance elements were subject to excessive friction in the bearings of the contact arm and a considerable sliding friction at the contact points thus requiring an amount of power which seriously detracted from the accuracy of the primary measuring instrument. These prior art units were incapable of being directly connected to sensitive instruments due to their size and the mechanical power required to operate them. For such sensitive indication, photo-electric tubes or other electronic devices with their associated apparatus were substituted thereby increasing the complexity and the weight of the system, as well as multiplying the inherent defects impeding the true transmission of the measured quantity. Previous resistance devices were also subject to corrosion and vibration and when incorporated as an integral part of the instrument, the mechanical linkage consisting of combinations of levers or gears enhanced the defects mentioned above.

The general object, therefore, of my invention is to supply a toroidal resistor which is subject to none of the inherent disadvantages of the prior art apparatus and may be utilized in combination with practically any type of measuring instrument to transmit electrically the measured quantity subject to the absolute minimum of mechanical impedance.

Another object of my invention is to provide a toroidal resistor which may be adapted for use on an indicating instrument already installed with the minimum of interference to the operation of said indicating instrument.

A further object of my invention is to provide a resistance transmitter which may be adapted for use with practically any type of indicating or recording instrument for remote indication without interfering with the local reading or observation of said instrument.

A still further object of my invention is to provide a resistance transmitting element which due to its sealed construction may operate in a vacuum or under pressure of an inert gas thus obviating the corrosive effect of atmospheres containing gases, vapors, or fluids ordinarily inimical to such devices.

Other objects, advantages and features will appear as the description of the invention proceeds in conjunction with the accompanying drawings in which similar reference characters refer to similar parts throughout the several views and in which:

Figures 3 and 4 are enlarged exploded views of the low torque resistor as shown in Figures 1 and 2;

Figures 1, 2:
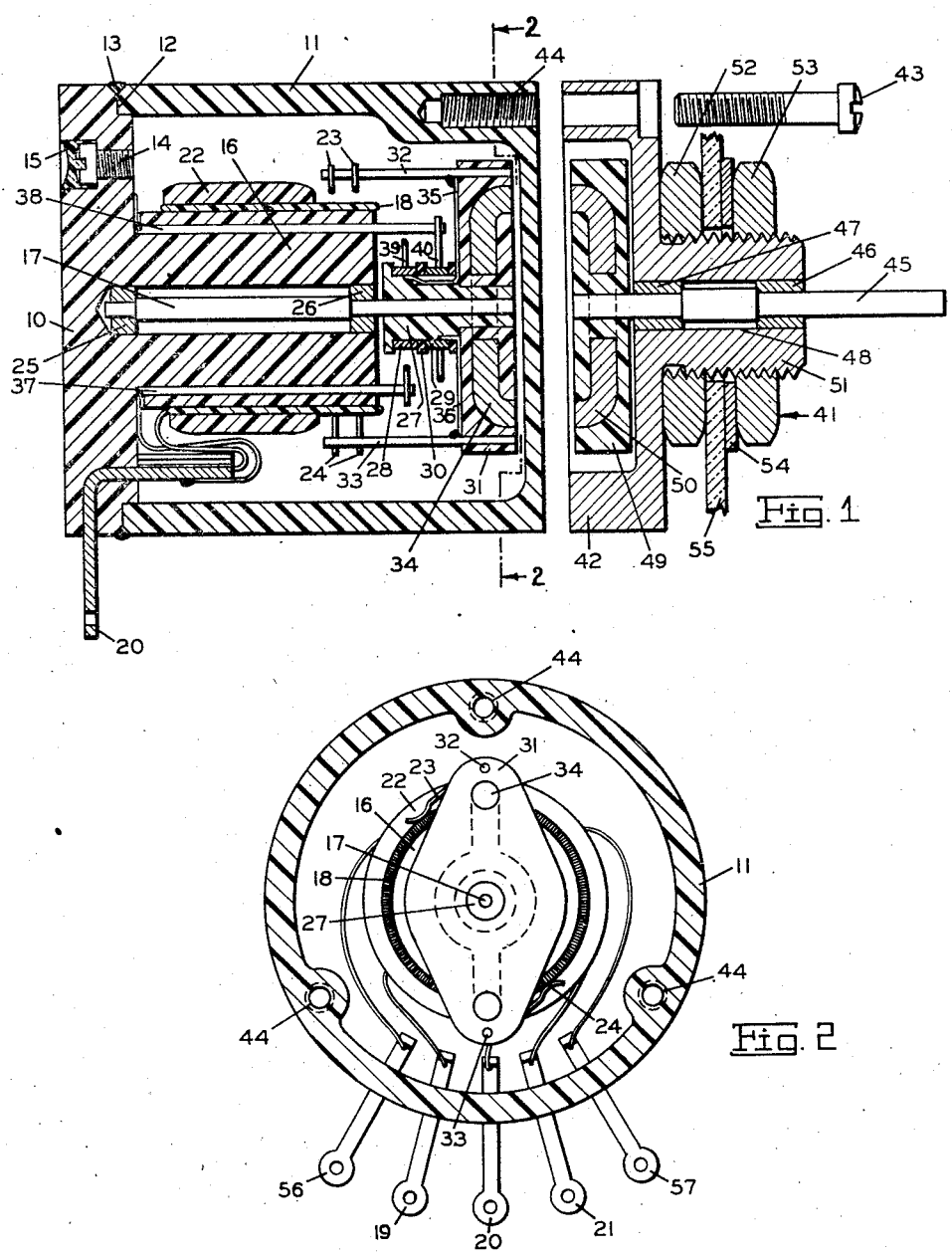
Figure 1 is an enlarged sectional elevation of one form of low torque toroidal resistor.
Figure 2 is an enlarged sectional elevation taken on line 2—2 of Figure 1.

Referring first to Figures 1 and 2, my low torque resistor comprises a base portion 10 covered by an hermetically sealed cover 11. As is indicated, this cover 11 is fabricated from a single block of material and fits closely over a shoulder 12 protruding from base portion 10. Sealing means 13 are provided to affix cover 11 to base portion 10 after assembly, thus rendering the instrument capable of being evacuated or put under the pressure of an inert gas. The choice between the vacuum and the inert gas under pressure would obviously be determined by the conditions of use. Under normal circumstances, a vacuum would be preferred, particularly in precision instrumentation where it would be obviously of great advantage to reduce all frictional elements to the lowest obtainable value as well as fully protect the instrument from dust and the corrosive action of ordinary atmospheres. Where the instrument was subject to corrosive fumes or gases or fluid submersion, an inert gas under pressure would most probably be considered necessary. Sealing means 13 may be of wax, plastic, or solder depending upon the materials used for base portion 10 and cover 11. These latter may be of glass, transparent plastic, opaque plastic, or of metal depending upon the field of use and weight limitations. In view of the intended use of my invention as adapted to the most delicate instrumentation, the preferred material is glass or some such frangible material so that any jar or mishandling which might adversely affect the accuracy of the low torque resistor would result in at least fracturing the cover and prevent its further employment. However, some other type of material, as indicated above, could well be utilized as might be advisable under the circumstances of use.

For purposes of evacuating the instrument or introducing the inert gas under pressure, screw 14 covered by seal 15 is provided. Seal 15 may be wax, plastic, rubber or other suitable material to accomplish the required purpose.

Extending from base portion 10 and forming an integral part thereof is cylindrical extension 16 which rotatably journals shaft 17 and further serves as a support for the other parts to be described. Around the periphery of cylindrical extension 16 is located the circular resistor 18 which consists of many turns of fine enameled resistance wire, preferably platinum or platinum-iridium, wound on a plastic or metal form. These coils may be wound around a full 360° of the coil form or only for 270° depending upon the use to which my invention may be placed. In the former case, the ends of the coil are united and three taps situated 120° apart are taken off to terminals 19, 20 and 21. In the latter case, usually only three terminals are provided to two of which are connected the ends of the resistance coil. Since the connections to the coil, brushes and external circuits are familiar to those skilled in the art, only one embodiment employing the full 360° resistance coil is here shown, but it is to be understood that the scope of my invention is considered to include both the 360° coil—5 terminal combination shown and the 270° coil—3 terminal combination not shown.

External to coil 18 and closely surrounding it is placed a cylindrical protector 22 which serves to support the resistance wire, keeping it snugly flat against form 18 and tending to prevent any separation of the turns under the minute drag of brushes 23 and 24. This cylindrical protector is made of plastic or other similar dielectric. After assembly of coil form 18 and protector 22 on extension 16, the enamel is carefully buffed from that portion of the coil lying beneath the brushes 23 and 24. This portion is then highly polished so as to present a minimal friction and the lowest obtainable contact resistance.

Shaft 17 is rotatably journaled in extension 16 by means of the anti-friction bearings 25 and 26 which are forced or cemented in place as shown. The anti-friction bearings used throughout my invention are preferably jewels as used in the finest instruments and watches but may be of the miniature ball-bearing type now being manufactured. Shaft 17 in turn supports bushing 27, platinum collector rings 28 and 29, washers 30 and arm 31. Arm 31 carries two metallic brush supports 32 and 33 and is molded of a suitable plastic. A small permanent magnet 34 is also molded within arm 31 which magnet may be formed preferably from Alnico or other highly magnetizable similar material. This magnet may be as shown, formed in one piece with upturned ends, or it may consist of one or more cylindrical rods embedded symmetrically with the long axis of arm 31.

Bushing 27 is turned or formed from plastic or other suitable dielectric material and is constructed so as to be a force fit on shaft 17. Small channels, diametrically opposed, are cut longitudinally in this bushing to accommodate the necessary electrical connections 35 and 36 leading from platinum collector rings 28 and 29 to the respective brush supports 32 and 33. One of these channels is indicated at 66 in Figure 3. Washers 30 are similarly of dielectric material and serve to insulatably separate the two platinum collector rings 28 and 29. Leads 37 and 38 are embedded or molded in cylindrical extension 16 and serve to support wire brushes 39 and 40. These brushes make contact with platinum collector rings 28 and 29. Leads 37 and 38 are connected to terminals 56 and 57. Terminals 19, 20, 21, 56 and 57 may be of brass or copper and are molded in place during the fabrication of base 10.

It should be noted in passing that brushes 23, 24, 39 and 40 are made up of stiff, hard-tempered platinum or platinum-iridium wire and being highly polished give positive contact with the least possible contact resistance in conjunction with an extremely low frictional drag. By keeping the mass of these brushes as small as possible and yet retain sufficient spring to make positive contact, their resonance period is kept outside the normal range of vibration frequencies encountered in mobile craft and hence renders the instrument free of undesired vibrational effects.

The unit described thus far comprises in itself an hermetically sealed low torque resistor-transmitter without however any driving means as yet indicated. Still referring to Figure 1, the detachable drive unit, generally designated by numeral 41, comprises a cylindrical cup-shaped portion 42, which is adapted to be concentrically secured to cover 11 of the driven unit by means of a plurality of screws 43 seated in threaded sockets 44. Cup-shaped portion 42 rotatably journals shaft 45 by means of anti-friction bearings 46 and 47 which are forced or cemented in place in central hole 48. Shaft 45 carries arm 49 which is identical in shape, configuration and material to arm 31.

This arm also contains molded therein permanent magnet 50 which is identical to previously described magnet 34. Since shafts 17 and 45 have the same longitudinal axis and magnets 34 and 50 rotate in closely adjacent and substantially parallel planes, rotation of shaft 45 and magnet 50 will effect a corresponding rotation in magnet 34 and shaft 17 thus effecting the desired change in resistance in the hermetically sealed resistor unit.

Cylindrical extension 51 of cup-shaped portion 42 is threaded and carries nuts 52 and 53 and soft washer 54. This extension with its associated nuts and washer facilitates the attachment of the resistor-transmitter to the glass or transparent plastic face of the primary instrument shown diagrammatically by numeral 55.

Figures 3 and 4 indicate clearly the relationship of the various parts and the preferred configurations of brushes 23, 24, 39 and 40. Figure 3 depicts the driven resistor-transmitter unit and Figure 4, the detachable drive unit.

Figures 5, 6:
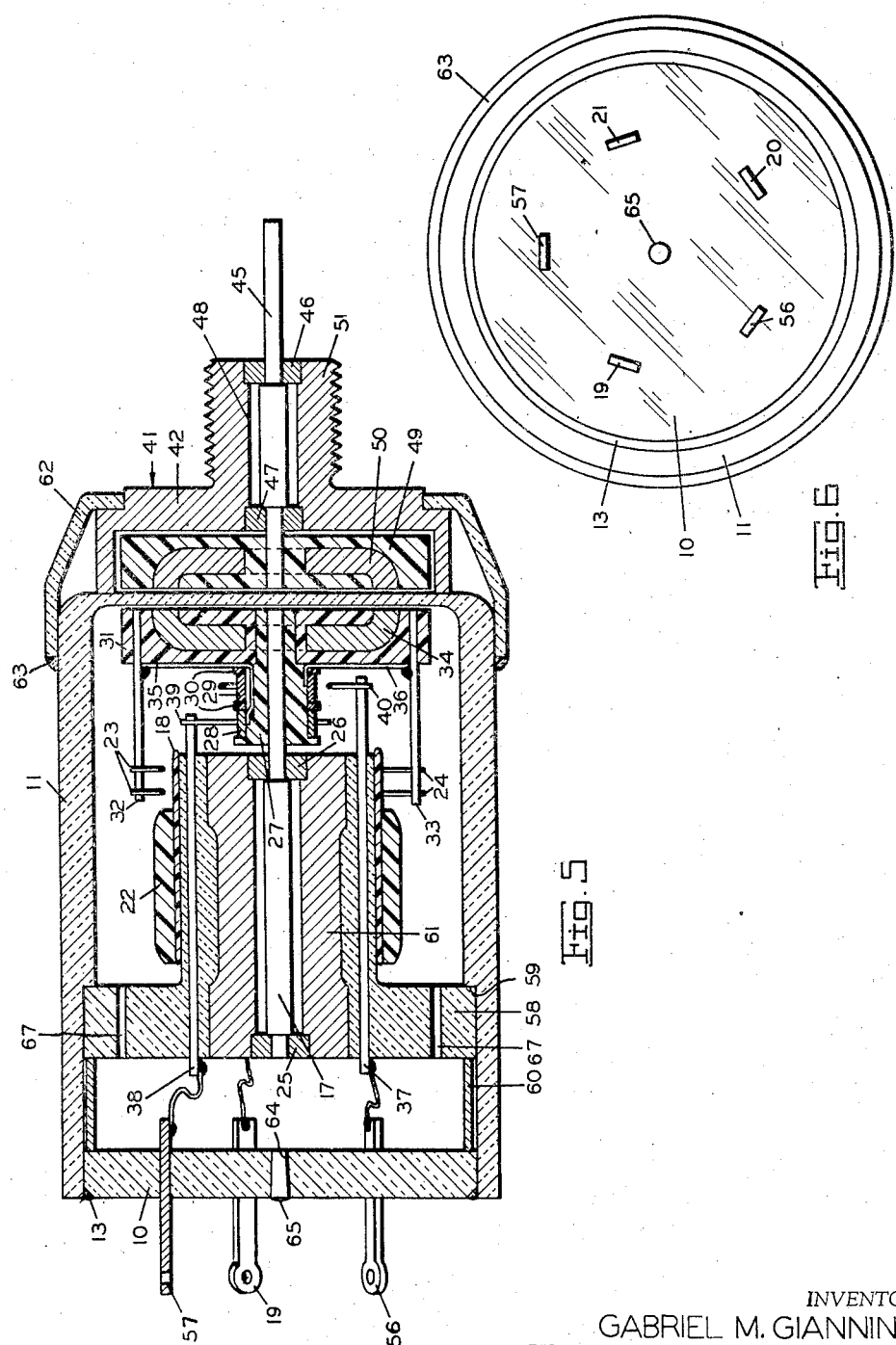
Figure 5 is an enlarged sectional elevation of another form of low torque toroidal resistor.
Figure 6 is an enlarged terminal end view of the form of low torque toroidal resistor shown in Figure 5.

Figure 5 illustrates another embodiment of my invention featuring electrical terminals protruding from the end of the base rather than from the side thereof as previously shown. Another difference is that the drive unit is secured by cement, solder, or other adhesive to cover 11 and is not detachable. Other minor differences will appear as the more detailed description proceeds. Base portion 10 consists of a disc sealed into cover 11 by sealing means 13. Base portion 10 contains a central orifice 64 which is provided for the purpose of evacuation or introduction of an inert gas under pressure. Orifice 64 is closed by taper plug 65 which is forced and/or sealed into place.

Sub-base portion 58 fits inside cover 11 against internal shoulder 59 and is held in place by cylindrical spacer 60. Sub-base portion 58 contains a metallic insert 61 which may be of some light metal such as aluminum molded therein during fabrication. This insert may be used to provide additional strength when a transparent plastic is used for base 10 and cover 11. Shaft 17 is rotatably journaled in insert 61 by means of anti-friction bearings 25 and 26.

Sub-base portion 58 is provided with a plurality, preferably three or more, of small holes 67 which serve to equalize the vacuum or inert gas pressure contained in the instrument as well as to provide a conduit for passing the desired electrical connections (not shown) from cylindrical resistor 18 to the base-embedded terminals 19, 20 and 21. The remainder of the driven unit supported by shaft 17 is similar to that described in connection with Figure 1.

Still referring to Figure 5, cup-shaped cylindrical portion 42 is now fixedly held adjacent to cover 11 by means of collar 62 which in turn is secured to cover 11 by a fillet of cement, solder or other adhesive as indicated at numeral 63. The remainder of the drive unit 41 is otherwise similar to the corresponding part described in connection with Figure 1.

Figure 6 illustrates the location and arrangement of the end terminals of the embodiment of my invention described in connection with Figure 5.

Referring again to Figures 1 and 5, shaft 45 may be coupled to the primary measuring instrument as may best serve the purpose intended. It may be coupled directly to the instrument shaft or it may be coupled to the instrument pointer by means of a light yoke attached to the end of shaft 45 and saddling the pointer. Drive unit 41 could be detached and the driven unit could be held to the face of an instrument by means of screws 43. The drive magnet 50 could then be installed on the pointer of the primary measuring instrument or the arm 49 could be installed in place of the pointer. Various other means of coupling my invention to the primary measuring instrument would be obvious to those skilled in the art and hence are not illustrated.

As hereinbefore briefly indicated, it is to be understood that the drawings are illustrative of but one electrical combination. Cylindrical resistor 18 may be wound completely as a 360° resistor or any desired fractional degree, usually between 270° and 360°. Various electrical connections can be utilized varying from the simplest form of a slide wire type output where but one end of the resistance coil and one brush are connected to the external circuit to the form as shown where the resistor is a continuous toroidal winding, tapped at 120° intervals and the brushes are diametrically opposed; an arrangement suitable for a D. C. Selsyn transmitter. Such connections are well known to the art and hence are not further illustrated or described.

From the foregoing it will be seen that my invention provides a sealed, low torque resistor-transmitter which requires less than three-thousandths inch ounces input torque for its operation and is ideally suited for direct connection to low torque sources including delicate instrument movements or other sensory elements utilized to measure a desired physical quantity. Thus my invention converts extremely low torque mechanical movements into proportional electrical voltages without introducing significant hysteresis in the measuring system. Weighing less than a few ounces and being contained in a cylinder less than two inches in length by an inch and a quarter in diameter, my low torque resistor may be directly coupled to the primary indicating gauge or instrument without impairing or obscuring its local function and observation and can be conveniently installed as data transmitters or recording pick-ups in all locations where space, weight, and reliable trouble-free operation are at a premium. Being constructed under precise manufacturing techniques of the highest quality materials and being sealed to all deleterious external influences, my invention has resulted in a low torque toroidal resistor having less contact pressure and resistance, more accuracy and requiring less torque input for its operation than any other similar device heretofore known or used.

Having thus described my invention, what I claim as new and desire to secure by Letters Patent of the United States is:

1. A low torque resistor-transmitter for remote indicating systems comprising a base; a cover hermetically sealed to said base; means contained in said base for introducing an inert gas under pressure; a toroidal resistor affixed to said base; a shaft structure rotatably journaled in anti-friction bearings carried by said base; wire brushes carried by said shaft structure contacting said toroidal resistor; electrical connection means between said toroidal resistor, said wire brushes and an external circuit; and magnetic driving means for rotating said shaft structure.

2. An hermetically sealed low torque toroidal resistor unit adapted to operate in a vacuum or under the pressure of an inert gas comprising a base; a toroidal resistance coil supported by said base and insulated therefrom; a shaft rotatably journalled by anti-friction bearings carried by said base; wire brushes carried by said shaft for contacting said toroidal resistance coil; electrical connection means carried by said shaft and said base for connecting the toroidal resistance coil and wire brushes to an external circuit; a first magnet carried by said shaft; a cover; a cup-shaped portion detachably secured to said cover; said cup-shaped portion supporting a second rotatable magnet co-acting with said first magnet whereby mechanical rotation of said second magnet will effect corresponding rotation of said first magnet.

3. An hermetically sealed low torque toroidal resistor as claimed in claim 2 wherein said base and said cover are constructed of frangible materials.

4. A low torque toroidal resistor unit comprising a cover; a terminal base bearing electrical terminals embedded therein and adapted to be hermetically sealed to said cover; means in said terminal base for evacuating or introducing an inert gas under pressure into said unit; a sub-base assembly rigidly supported under said cover and longitudinally displaced from said terminal base; a toroidal resistance coil insulatably supported by said sub-base; a shaft structure rotatably journalled in anti-friction bearings in said sub-base; wire brushes carried by said shaft structure for contacting said resistance coil; electrical connection means between said resistance coil, said wire brushes and said electrical terminals; and co-acting magnetic driving means for rotating said shaft structure.

5. A low torque toroidal resistor unit as claimed in claim 4 further characterized by having a metallic insert molded centrally in said sub-base.

6. A low torque toroidal resistor unit as claimed in claim 4 including means carried by said sub-base for equallizing the pressure within said unit.

7. A low torque toroidal resistor unit as claimed in claim 4 including means for affixing said unit to the cover of a primary measuring instrument.

GABRIEL M. GIANNINI.

REFERENCES CITED

The following references are of record in the file of this patent:

UNITED STATES PATENTS

| Number | Name | Date |
|---|---|---|
| 1,247,817 | Nakamigawa | Nov. 20, 1917 |
| 1,304,022 | Cole | May 20, 1919 |
| 1,607,512 | Churcher et al. | Nov. 16, 1926 |
| 2,073,948 | Schofield | Mar. 16, 1937 |
| 2,256,833 | McDonald | Sept. 23, 1941 |